United States Patent [19]

Blake et al.

[11] Patent Number: 5,752,264
[45] Date of Patent: May 12, 1998

[54] COMPUTER ARCHITECTURE INCORPORATING PROCESSOR CLUSTERS AND HIERARCHICAL CACHE MEMORIES

[75] Inventors: Michael Andrew Blake, Wappingers Falls; Carl Benjamin Ford, III; Pak-kin Mak, both of Poughkeepsie, all of N.Y.

[73] Assignee: International Business Machines Corporation, Armonk, N.Y.

[21] Appl. No.: 698,192

[22] Filed: Aug. 15, 1996

Related U.S. Application Data

[63] Continuation of Ser. No. 414,670, Mar. 31, 1995, abandoned.

[51] Int. Cl.$^6$ .................................................. G06F 12/08
[52] U.S. Cl. .................... 711/144; 711/141; 711/130; 711/131; 711/122
[58] Field of Search ............................. 395/446, 449, 395/454, 457, 458, 467, 468, 471, 484

[56] References Cited

U.S. PATENT DOCUMENTS

| | | | |
|---|---|---|---|
| 4,317,168 | 2/1982 | Messina et al. | 395/470 |
| 4,345,309 | 8/1982 | Arulpragasam et al. | 395/467 |
| 4,695,943 | 9/1987 | Keeley et al. | 395/467 |
| 4,755,930 | 7/1988 | Wilson, Jr. et al. | 395/449 |
| 4,775,955 | 10/1988 | Liu | 395/472 |
| 4,972,338 | 11/1990 | Crawford et al. | 395/416 |
| 5,023,776 | 6/1991 | Gregor | 395/449 |
| 5,197,130 | 3/1993 | Chen et al. | 395/800.03 |
| 5,208,914 | 5/1993 | Wilson et al. | 395/859 |
| 5,222,229 | 6/1993 | Fukuda et al. | 395/553 |
| 5,241,641 | 8/1993 | Iwasa et al. | 395/449 |
| 5,247,649 | 9/1993 | Bandoh | 395/457 |
| 5,265,232 | 11/1993 | Gannon et al. | 395/451 |
| 5,274,790 | 12/1993 | Suzuki | 395/460 |
| 5,335,325 | 8/1994 | Frank et al. | 395/490 |

FOREIGN PATENT DOCUMENTS 0330425  8/1989  European Pat. Off. .

OTHER PUBLICATIONS

Handy, "The Cache Memory Book", 1993, pp. 73–75, 77–82.

*Primary Examiner*—Eddie P. Chan
*Assistant Examiner*—Kevin L. Ellis
*Attorney, Agent, or Firm*—Lynn Augspurger, Esq.; Morgan & Finnegan, LLP

[57] ABSTRACT

A hierarchical cache architecture that reduces traffic on a main memory bus while overcoming the disadvantages of prior systems. The architecture includes a plurality of level one caches that are of the store through type, each level one cache is associated with a processor and may be incorporated into the processor. Subsets (or "clusters") of processors, along with their associated level one caches, are formed and a level two cache is provided for each cluster. Each processor-level one cache pair within a cluster is coupled to the cluster's level two cache through a dedicated bus. By configuring the processors and caches in this manner, not only is the speed advantage normally associated with the use of cache memory realized, but the number of memory bus accesses is reduced without the disadvantages associated with the use of store in type caches at level one and without the disadvantages associated with the use of a shared cache bus.

26 Claims, 4 Drawing Sheets

COMPUTER ARCHITECTURE INCORPORATING PROCESSOR CLUSTERS AND HIERARCHICAL CACHE MEMORIES

This is a continuation of application Ser. No. 08/414,670, filed on Mar. 31, 1995, now abandoned.

BACKGROUND OF THE INVENTION

The present invention is related to computers, and more particularly to Multi-Processor computer systems.

Often, the overall speed of a Multi-Processor computer system is limited by the speed at which data can be communicated over a system bus. A typical Multi-Processor system employs a "shared bus" to link together the system's processors and other system components, such as system memory and input/output devices. Thus, whenever a microprocessor needs to "signal" another microprocessor, or to signal some other system component, it must request exclusive access to the shared bus. If access to the bus is not exclusive, conflicting messages may appear on the bus at the same time, and thereby interfere with one another.

In high performance systems there are a great number of processors, each requiring access to the shared bus. However, the rate at which bus access requests can be honored is limited by the availability of the shared bus. As designers attempt to pack more processors into a system, the rate of bus access requests exceeds the bus capacity. Thus, the shared bus can not honor the bus access requests fast enough and becomes a drag on system performance. Accordingly, designers have developed methods to reduce the rate of shared bus accesses. One such method is to employ cache memory.

Figure 1:
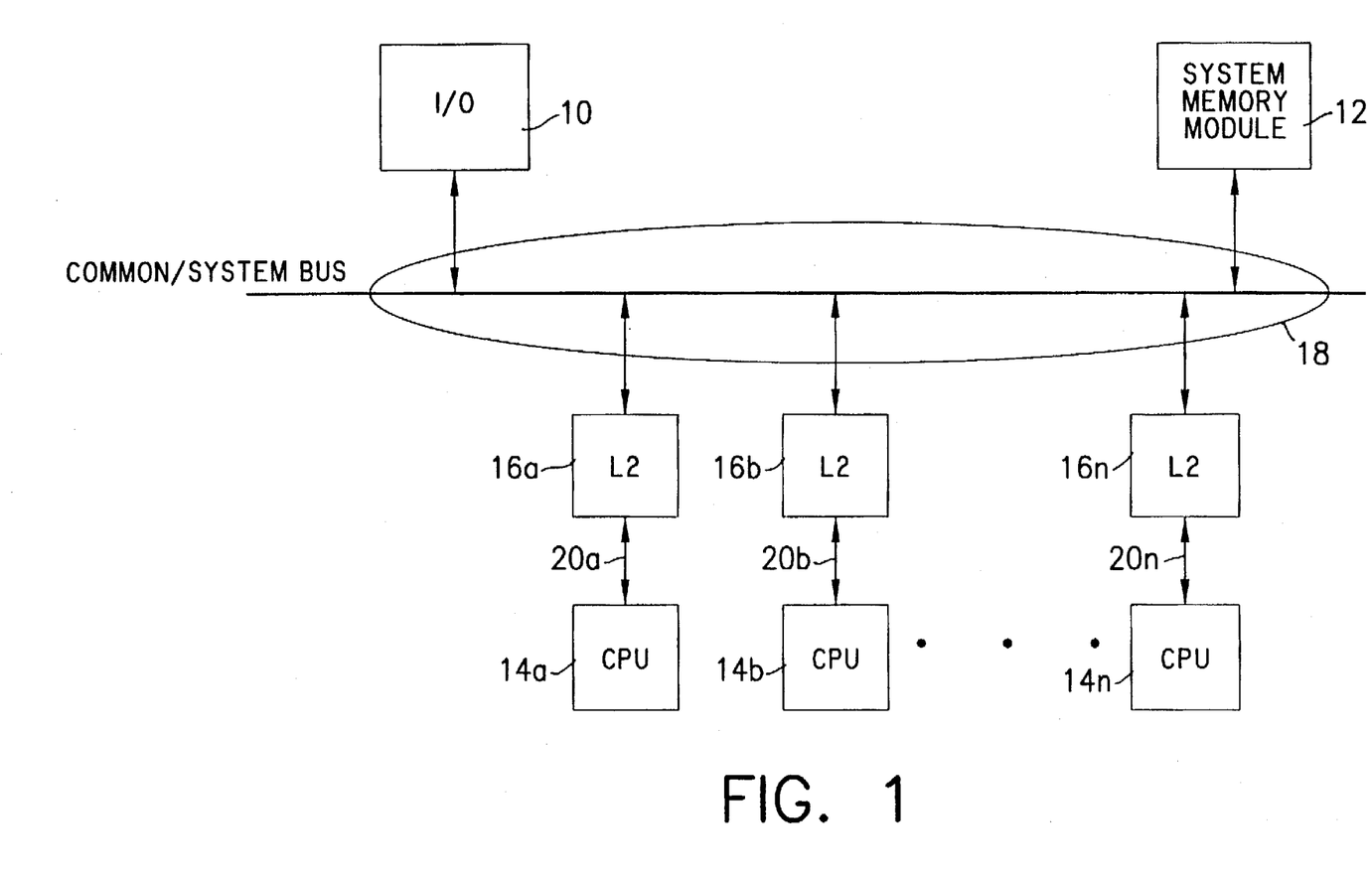
FIG. 1 is a block diagram of a typical Multi-Processor computer system that employs a shared bus.

A block diagram of a typical Multi-Processor system that uses cache memory is shown in FIG. 1. The system components include an I/O device 10, a system memory module 12, a plurality of processors 14a–n, each of which may or may not include an internal cache, and a plurality of "level two" caches 16a–n, each level two cache being associated with a processor. The components are linked together via a shared bus 18. As can be seen from the figure, any time two components need to signal each other, they must do so through the shared bus; the only exception being communications between a processor and its associated level two cache. Communications between processors 14a–n and caches 16a–n are carried out over point to point buses 20a–n.

In accordance with cache memory theory, frequently requested data and/or program sections are stored in cache memories. Whenever a processor requires a data or program section that is stored in either its internal cache or associated level two cache, it may read that section directly from one of these caches rather than from the system's main memory. Thus, each time a requested data and/or program section is found in one of the requesting processor's cache memories the processor does not have to access the main memory and a shared bus access is "saved".

Although the use of cache memory can save bus accesses, it does have an associated "bus access cost". In a system employing cache memory, the shared bus must be accessed in order to perform certain data coherency operations that are not necessary in a cacheless system. A typical data coherency operation, or "castout", is well illustrated with reference to FIG. 1. For purposes of the illustration it is assumed that the processors do not have internal caches.

It is possible that, at some point in the operation of the FIG. 1 system, data stored in memory 12 at "memory location 1" will also be stored in caches 16a–n. It is assumed for purposes of the following description that the system is in such a state, and that the next operation to be performed is a modification of the memory location 1 data by processor 14a. Upon finding the memory location 1 data in cache 16a, processor 14a could simply modify the cache 16a copy of the memory location 1 data. However, if this were the case, following the modification, cache 16a would contain a different version of the memory location 1 data than that contained in both memory 12 and caches 16b–n. This is known as a cache coherency problem. One way to eliminate such a problem is for cache 16a to initiate a castout following modification of the cache 16a data by processor 14a. During the castout, cache 16a writes the updated memory location 1 data to memory 12 and caches 16b–n so that they will contain the updated version of the data and not the erroneous unmodified version. Such castout write operations are performed over the shared bus and they are part of the bus access cost associated with maintaining data coherency.

Moreover, in systems that use cache memory, data to be operated on by a processor may not be present in the processor's internal or level two cache. This condition results in a "cache miss", requiring that the data be accessed in main memory through the shared bus, just as in a cacheless system.

Thus, although the use of cache memory may improve system speed by reducing the number of bus accesses, further improvements may be made by reducing the number of bus accesses required to maintain data coherency, and by reducing the number of cache misses. One way to do this is through a hierarchical bus structure.

U. S. Pat. No. 5,241,641 to Iwasa et al, describes a Hierarchical Cache Memory Apparatus that employs two levels of cache memory in an attempt to reduce traffic on a main memory bus. The first level of caches in the Iwasa apparatus refers to a plurality of "store in" caches, each cache associated with a processor. The second level refers to a plurality of shared "store in" caches, each shared cache being coupled to a subset of processors via a shared bus.

In theory, when data or instructions are requested in the Iwasa system, and a level one "cache miss" occurs, the request may be serviced by the associated level two cache, thereby reducing traffic on the main bus. However, the performance of the Iwasa system is limited through its use of "store in" type caches. By employing "store in" type caches at level one rather than employing "store through" type caches, Iwasa complicates the updating of the level two caches. In a "store through" type system, updates of the level one caches are automatically written through to the level two caches, whereas in a "store in" type system each update of a level one cache requires a second write operation at an indeterminate time in the future to write the updated data from the level one cache to the level two cache.

The Iwasa system is also limited by its use of shared busses to connect the level one caches to the level two caches. Like any other shared bus, the shared cache busses of Iwasa are limited in the rate at which they can honor bus access requests. Thus, the Iwasa system may relieve the bottleneck at the main bus only to create a bottleneck at the cache bus.

SUMMARY OF THE INVENTION

The present invention provides a hierarchical cache architecture that reduces traffic on a main memory bus while overcoming the disadvantages of prior systems. The architecture includes a plurality of level one caches that are of the store through type, each level one cache is associated with a processor and may be incorporated into the processor. Subsets (or "clusters") of processors, along with their associated level one caches, are formed and a level two cache is provided for each cluster. Each processor-level one cache pair within a cluster is coupled to the cluster's level two cache through a dedicated bus. By configuring the processors and caches in this manner, not only is the speed advantage normally associated with the use of cache memory realized, but the number of memory bus accesses is reduced without the disadvantages associated with the use of "store in" type caches at level one and without the disadvantages associated with the use of a shared cache bus.

The invention reduces the number of main memory bus accesses in a number of ways. One way is through the hierarchical cache structure. In the invention's hierarchy the level one caches are store through, and therefore the level two caches contain copies of all the data and/or instructions stored in the level one caches in their cluster. Thus, when a first processor requests data and/or instructions that are not stored in its level one cache, but are stored in the level one cache of a second processor within the same cluster, the data may be transferred to the first processor by way of the shared level two cache. Therefore, the first processor's request is handled entirely within the lower portion of the hierarchy and a memory bus access is saved.

Another way in which the invention reduces the number of main memory bus accesses is by decreasing the amount of redundantly stored data. As a result of combining several private level two caches (as shown in FIG. 1) into a logical level two cache that is locally shared, the storing of repetitious copies of data among the caches is eliminated. For example, a data unit that was occupying three cache lines by occupying one line each of three separate level two caches, would occupy only one line of a shared level two cache that is formed from the three separate caches. The two lines that are saved may be used for new data, thereby improving the level two cache hit ratio.

Still another advantage of the cluster architecture is realized by defining a plurality of ownership states that convey information about how individual data units are stored in a cache. In a preferred embodiment of the invention, each cache, both level one and level two, includes a directory which maintains a record of the state for each data unit stored in that cache. The possible directory states for the level one caches are different from the possible directory states for the level two caches. However the possible ownership states for both levels are derived from two fundamental ownership states, "exclusive", and "read only". When a cache has exclusive ownership of a data unit it may freely modify that unit without causing a cache coherency problem because it is the only cache currently storing a copy of that data unit. On the other hand, when a cache holds data in a read only state, one or more other caches are also holding the data, and the cache cannot modify the data without causing a cache coherency problem.

In the preferred embodiment, the ownership state of data at each level is specified as being either one of the "exclusive" states or one of the "read only" states. Thus, for example, a data unit may be "read only" at level one but be "exclusive" at level two. That is, a data unit may be present in more than one level one cache within a cluster but be present only in that cluster. This ownership scheme is referred to as "hierarchical data ownership", and it may be described in a summary fashion as consisting of three possible ownership states: (1) Cluster—Read Only, Processor—Read Only; (2) Cluster—Exclusive, Processor—Read Only; and (3) Cluster—Exclusive, Processor—Exclusive. It is not possible for a level one cache to have exclusive ownership while a cluster has read-only ownership. Under hierarchical ownership a data unit that is exclusively owned by a cluster may be modified without necessitating an operation on the shared bus. This is true regardless of the ownership status of the modifying processor. Only when copies of the data are stored in more than one cache (cluster ownership is read only) must a memory bus operation be performed in order to maintain cache coherency.

Further advantages over prior systems are realized through the use of "store through" level one caches. For one, in the present invention the data in a given level one cache is a subset of the data in that level one cache's associated level two cache, and thus it is not necessary for the level one cache to perform castout operations. That is, all level one data within a cluster is written to the cluster's level two cache so that when a first level one cache within the cluster requests a data unit from the cluster's level two cache there will not be a second level one cache within the cluster that has a more up to date copy of the requested data and there will be no need to perform a castout.

Moreover, by rendering level one castout operations unnecessary, the present invention allows the complex circuitry normally associated with castouts to be excluded from the level one caches. Such circuitry typically includes Least Recently Used (LRU) castout controls, line changed controls, castout buffers, and line changed indicators.

Elimination of castout circuitry has the added advantage that the amount of physical area taken up by the CPU-level one cache pairs is reduced. In particular, elimination of the LRU castout buffer allows for a large savings in area because memory is a large consumer of chip space when compared to other types of integrated circuits. Sufficient area reduction allows each CPU-level one cache pair to be housed within a single microchip. Thereby, reducing the total number of chips required to build the system, and thus reducing the cost of the system.

Still another advantage of using "store through" level one caches is that they provide for simplified error checking.

In any computer system it is highly advantageous to protect data residing in a cache against electrical retention problems by using an Error Correction Code (ECC). In a typical ECC implementation a plurality of "check bits" are generated by applying a predetermined code to the data that is to be written to the cache. The check bits are stored in the cache along with the data. When the data is read from the cache by a "receiver", the check bits are also read. With knowledge of the code, the receiver can examine the data and check bits to determine whether or not a data bit has been altered, and if so, which bit was altered. In this manner, the receiver can recover the correct data even if an error has occurred.

An example of an ECC is the single error correcting Hamming code in which 5 check bits are appended to each word of data (16 bits). This stands in contrast to a parity check, wherein, for example, a single bit is appended to 8 data bits so as to maintain the predetermined parity (even or odd) of the group. In a parity check system, a receiver can detect that an error has occurred by noting that the parity of the received group is not in conformity with the predetermined parity of the system, but can not detect which bit(s) is erroneous.

In the case of systems such as Iwasa, which use "store in" level one caches, an ECC, such as a Hamming code, is needed to insure that the correct data can be recovered at the processor or level two cache in the event of an error. In the present invention, the much simpler parity check may be used.

Employing a parity check at the level one cache works in the present invention because of the use of "store through" level one caches. In the store through configuration, data written to a level one cache is immediately written through to the corresponding level two cache which has ECC protection. Thus, if the processor associated with the level one cache attempts to read the data from the level one cache and detects an error (by checking parity) in the data, the data may be immediately re-read from the level two cache, since the level two cache contains a correct copy of the data. Hence, it is not necessary to provide a means for the level one cache to correct the corrupt data. By contrast, in the store in configuration, data that is written from a level one cache to a level two cache may change several times within the level one cache before the level two cache receives the data. Therefore, corrupted data cannot be simply re-read, and an ECC must be provided at the level one caches so that the corrupted data can be corrected.

By using parity checking instead of an ECC, the present invention reduces the number of check bits that must be transferred between the level one and level two caches. Accordingly, the physical area of the level one cache may be proportionately reduced. For example, to transmit one word of data at a time using a store in cache with a Hamming code, 21 bits of data must be transmitted. To transmit one word of data using a store through cache with byte parity, 18 bits must be transmitted. Therefore, 3 less bit paths are required in the store through system.

In addition realizing advantages through the hierarchical architecture and the store through level one caches, the present invention realizes advantages through the use of point to point cache busses. Since each level one in a cluster is coupled to the cluster's level two cache by a dedicated bus, the level one caches do not have to compete for the use of the cache bus. Thereby, solving the problem of bottlenecking at the cache bus. Moreover, logic for arbitrating among users of a shared bus does not have to be included in the level one and level two caches, thereby allowing for further reductions in the size of the level one and level two caches.

DETAILED DESCRIPTION OF THE DRAWINGS

Figure 2:
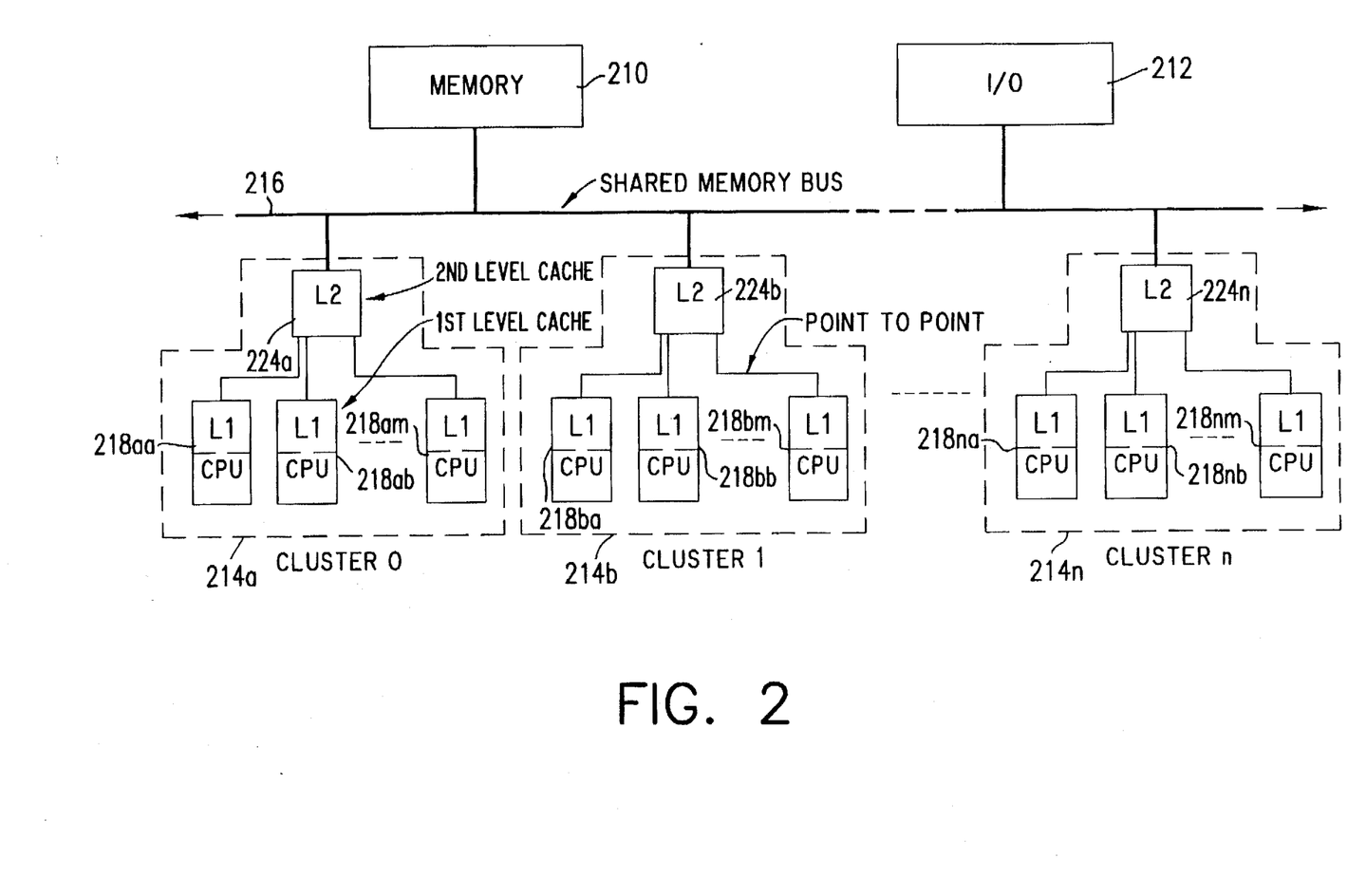
FIG. 2 is a block diagram of a Multi-Processor computer system employing the present invention.

Referring to FIG. 2, there is shown a Multi-Processor computer system incorporating the present invention. The system includes: a system memory module 210; an input/output device (I/O device) 212; a plurality of clusters 214a–214n, and a common bus 216 that links the memory module, I/O device, and clusters together. Each cluster includes a level two cache, level two caches 224a–224n, and a plurality of microprocessors (CPU), CPUs 218aa–218an for cluster 214a, CPUs 218ba–218bm for cluster 224b, and CPUs 218na–218nm for cluster 214n. Each CPU has a level one cache, and is coupled to its respective level two cache through the level one cache via a point to point bus. Each cluster is coupled to the shared bus through its level two cache.

In the system of FIG. 2, a CPU data fetch must encounter a cache miss at both the CPU's level one cache and the CPU cluster's level two cache in order to necessitate a shared bus access. Thus, for example, if CPU 218aa needs to modify a data unit, it first looks for the unit in its level one cache. If the data unit is not among the units stored in the level one cache, a level one cache miss occurs and a level one cache data request is generated. The request is sent to level two cache 224a which then searches its directory for the requested data. If a level two cache miss occurs, the level two cache retrieves the data from system memory 210 via shared bus 216 and then relays it to CPU 218aa. If the level two cache is holding the requested data, it simply sends the data to CPU 218aa and no shared bus access is required.

The above illustration, provides a simplified overview of how a memory fetch operation is conducted according to the present invention. The simplicity of the illustration is achieved by overlooking the problem of data coherency. In order to maintain data coherency in the FIG. 2 embodiment, several directory states are defined for both the level one and level two caches. Each cache stores its current directory state in a memory location (or "directory") and modifies that state to reflect system operations.

The directory states for the level one and level two caches are described below. The directory state descriptions are followed by a description of the possible system operations. Each operation is defined as a series of steps. The sequence of steps that make up an operation are defined by the task that is to be accomplished and the directory states of the caches at the time the task is to be accomplished. A description of the possible steps follows the description of operations. Finally, four tables listing all the possible operations is provided. In the tables the following information is included for each operation: (1) the initial state of the local CPU (LPO), that is, the CPU that initiates the store or fetch; (2) the initial state of the local level two cache (LL2), that is, LPO's associated level two cache; (3) the initial state of the remote level two cache (RL2), that is, one or more of the other level two caches; (4) the final state of LPO; (5) the final state of LL2; (6) the final state of RL2; and (7) the sequence of steps taken to perform the operation.

Figure 3:
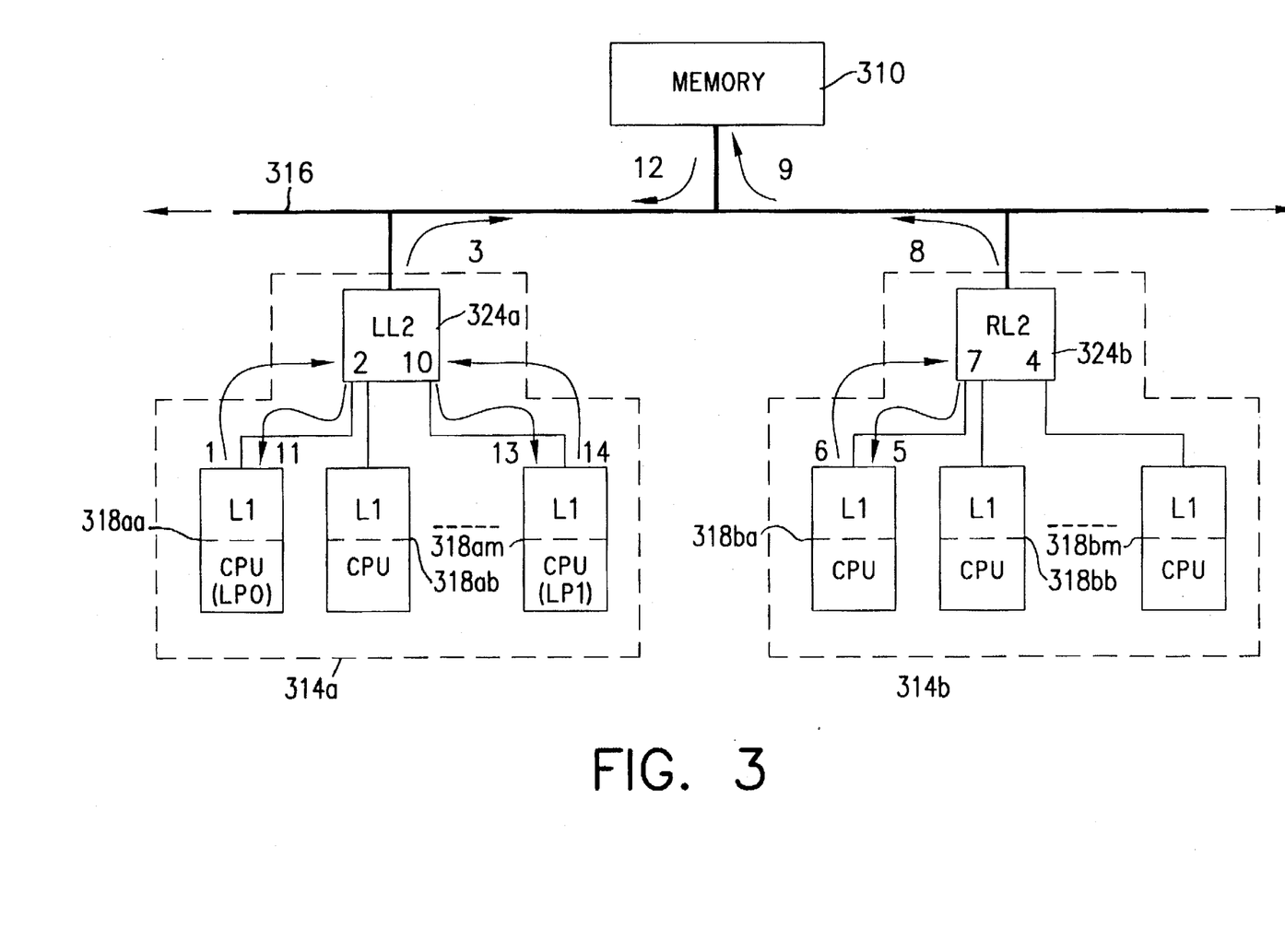
FIG. 3 is a block diagram illustrating the flow of data/commands for each of the operation steps of the present invention.

To aid in the understanding of the directory state, operation, and operation step descriptions a diagram of a two cluster system in accordance with the present invention is provided in FIG. 3. The system includes: a system memory 310, a first cluster 314a, a second cluster 314b, and a shared bus 316 that links the clusters and system memory together. The first cluster is made up of a level two cache 324a and a plurality of processors 318aa–318am. Similarly, the second cluster is made up of a level two cache 324b and a plurality of processors 318ba–318bm. A plurality of signal paths, represented by arrows 114, show how data flows during each of the operation steps described below. Thus, for example, signal path 1 shows the flow of commands from CPU 318aa to level two cache 324a, which corresponds to operation step 1 (processor commands to local L2) listed below.

To further aid in the understanding of the directory state, operation, and operation step descriptions the following nomenclature is observed:

Level two cache 324a is referred to as the local level two cache (LL2);

Level two cache 324b is referred to as the remote level two cache (RL2);

CPU 318aa is referred to as the local processor (LPO); CPU 318am is referred to as a local processor (LP1) within the same cluster as LPO, or "attached local processor"; and CPU 318ba is referred to as a remote processor.

Definitions of Directory States

Three directory states are defined for the local processor (LPO), I, R and E. When data is owned in the I state it does not reside in the local processor's L1 cache. Data owned in the R state resides in the local processor's L1 cache in a 'read-only' state. This means the processor can reference this copy but can not update it because identical copies of the data may exist in other processors' L1 caches. Data owned in the E state resides in the local processor's L1 cache in an 'exclusive' state. This means the processor can reference or update the data because a copy does not exist in another processors' L1 cache.

Eleven directory states are defined for the level two caches (LL2 and RL2):

I—Invalid.

RRU—Read Only to cluster, Read Only to processor, Unchanged.

ERU—Exclusive to cluster, Read Only to processor, Unchanged.

ERC—Exclusive to cluster, Read Only to processor, Changed.

ERx—Exclusive to cluster, Read Only to processor, dont care.

EEUO—Exclusive to cluster, Read Only to processor, Unchanged, LPO is allowed to reference or update the L2's copy of the data.

EEUI—Exclusive to cluster, Exclusive to processor, Unchanged, LPO is allowed to reference or update the L2's copy of the data.

EECO—Exclusive to cluster, Exclusive to processor, Changed, LPO is allowed to reference or update the L2's copy of the data.

EEC1—Exclusive to cluster, Exclusive to processor, Changed, LP1 is allowed to reference or update the L2's copy of the data.

EExO—Exclusive to cluster, Exclusive to processor, dont care, LPO is allowed to reference or update the L2's copy of the data.

EEx1—Exclusive to cluster, Exclusive to processor, dont care, LP1 is allowed to reference or update the L2's copy of the data.

In the I state data does not reside in the L2 cache or in any connected processor's L1 cache.

In the RRU state data resides in the L2 cache in a 'read-only' state. An identical copy also resides in one or more connected processor's L1 caches in a 'read-only' state. The L2 copy is identical to the copy stored in memory and any connected processors in the cluster are allowed to reference the L2 copy, but are not allowed to update it. An identical copy of this data may also exist in another L2 cache.

In the ERU state data resides in the L2 cache in a 'exclusive' state. An identical copy also resides in one or more of the connected processors' LI caches in a 'read-only' state. The L2 copy is identical to the copy stored in memory and any connected processors in the cluster are allowed to reference the L2 copy, but are not allowed to update it. An identical copy of this data does not exist in another L2 cache.

In the ERC state data resides in the L2 cache in an 'exclusive' state. An identical copy also resides in one or more connected processor's L1 cache in a 'read-only' state. The L2 copy is more up-to-date than the copy stored in memory and any connected processors in this cluster are allowed to reference the L2 copy, but are not allowed to update it. An identical copy of this data does not exist in another L2 cache.

In the ERx state data resides in the L2 cache in an 'exclusive' state. An identical copy also resides in one or more connected processor's LI cache in a 'read-only' state. The L2 copy may be more up-to-date than the copy stored in memory and any connected processors in this cluster are allowed to reference the L2 copy, but are not allowed to update it. An identical copy of this data does not exist in another L2 cache.

In the EEUO state data resides in the L2 cache in an 'exclusive' state. An identical copy also resides in the LPO processor connected to the L2 in an 'exclusive' state. The L2 copy is identical to the copy stored in memory and LPO is allowed to reference or update the L2 copy. This data does not reside in any other processor's L1 cache or in any other L2 cache.

In the EEU1 state data resides in the L2 cache in an 'exclusive' state. An identical copy also resides in the LP1 processor connected to the L2 in an 'exclusive' state. The L2 copy is identical to the copy stored in memory and LP1 is allowed to reference or update the L2 copy. This data does not reside in any other processor's LI cache or in any other L2 cache.

In the EECO state data resides in the L2 cache in an 'exclusive' state. An identical copy also resides in the LPO processor connected to the L2 in an 'exclusive' state. The L2 copy is more up-to-date than the copy stored in memory and LPO is allowed to reference or update the L2 copy. This data does not reside in any other processor's LI cache or in any other L2 cache.

In the EEC1 state data resides in the L2 cache in an 'exclusive' state. An identical copy also resides in the LP1 processor connected to the L2 in an 'exclusive' state. The L2 copy is more up-to-date than the copy stored in memory and LP1 is allowed to reference or update the L2 copy. This data does not reside in any other processor's LI cache or in any other 12 cache.

In the EExO state data resides in the L2 cache in an 'exclusive' state. An identical copy also resides in the LPO processor connected to the L2 in an 'exclusive' state. The L2 copy may be more up-to-date than the copy stored in memory and LPO is allowed to reference or update the L2 copy. This data does not reside in any other processor's LI cache or in any other L2 cache.

In the EEx1 state data resides in the L2 cache in a 'exclusive' state. An identical copy also resides in the LP1 processor connected to the L2 in an 'exclusive' state. The L2 copy may be more up-to-date than the copy stored in memory and LPO is allowed to reference or update the L2 copy. This data does not reside in any other processor's LI cache or in any other L2 cache.

Description Of Operations

The first operation sequence to be discussed is the Fetch Read Only Operation Sequence 1, "FRO-1". In this sequence an instruction fetch by processor 0 finds the state of the storage unit to be 'invalid' in the L1 cache. This results in a 'Fetch Read Only' request being issued to the local L2. The L2 does a directory search for the processor's request and determines the storage unit also exists in the 'invalid' state. This results in a 'Fetch Read Only' request issued on the shared bus to the memory and to all clusters. Each remote L2 then does a directory search in response to the request received over the bus. A status of 'invalid' is found in all the remote L2's. With no data being castout from a remote L2, the system memory places the requested storage unit on the shared bus. As the local L2 receives the data over the bus it forwards the data to processor 0 and updates its directory with a new status of RRU.

The second operation sequence is the Fetch Read Only Operation Sequence 2 (FRO-2). An instruction fetch by processor 0, finds the state of the storage unit to be 'invalid' in the LI cache. The L2 performs a directory search in response to the processor's request and determines that the requested data exists in a state which is 'exclusive' to both the local L2 and processor 0. The requested data unit is accessed from the L2 cache and sent back to processor 0. The L2 directory state of the data is left the same.

The third operation sequence is the Fetch Read Only, Operation Sequence 3 (FRO-3). An instruction fetch by processor 0 finds the state of the data unit to be 'invalid' in the L1 cache. This results in a 'Fetch Read Only' request being issued to the local L2. The L2 performs a directory search for the requested data request and determines the data unit exists in a state which is 'exclusive' to both the local L2 and processor 1. The L2 then sends local processor 1 a cross invalidation (XI, or "castout") command of 'Demote to RO' and waits to receive an XI response before proceeding. Processor 1 sends the XI response to the L2 with the understanding that no new Store commands to the data unit will be sent, and that it no longer has the data in an 'exclusive' state. The requested data unit is accessed from the L2 cache and sent back to processor 0. Finally, the L2's directory is updated to reflect that the data unit is 'exclusive' to the local L2 and 'read-only' to all local processors.

The fourth operation sequence is the Fetch Read Only Operation Sequence 4 (FRO-4). An instruction fetch by processor 0 finds the state of the data unit to be 'invalid' in the L1 cache. This results in a 'Fetch Read Only' request issued to the local L2. The L2 performs a directory search for the requested data and determines that the data unit exists in a state which is 'read-only' to the local L2 and 'invalid' in the remote L2s. The requested data unit is then accessed from the local L2 cache and sent to processor 0. The directory state in the local L2 is left the same.

The fifth operation sequence is the Fetch Read Only Operation Sequence 5 (FRO5). An instruction fetch by processor 0 finds the state of the storage unit to be 'invalid' in the L1 cache. This results in a 'Fetch Read Only' request issued to the local L2. The L2 does a directory search for the processor's request and determines the storage unit exists in a state which is 'read-only' to the local L2 and the remote L2s. The requested storage unit is accessed from the L2 cache and sent back to processor 0, and the directory state is left the same.

The sixth operation sequence is the Fetch Read Only Operation Sequence 6 (FRO6).

An instruction fetch by processor 0 finds the state of the storage unit to be 'invalid' in the L1 cache. This results in a 'Fetch Read Only' request issued to the local L2. The L2 does a directory search for the processor's request and determines the storage unit exists in an 'invalid' state. This results in a 'Fetch Read Only' request issued on the shared bus to the memory and to all other clusters. Each remote L2 then does a directory search with the bus command request. A remote L2 finds the storage unit exists in a state which is 'exclusive' to the L2 and to one of its processors. The other remote L2s finds the storage unit in an 'invalid' state in each of their caches. The remote L2 sends the 'exclusive' processor a cross invalidation command of 'Demote to RO' and then waits for the XI response. Processor sends response to L2 with the understanding that no new Store commands to the storage unit will be sent, and that it no longer has the data in an 'exclusive' state. Upon the XI response, the remote L2 sees its copy of the storage unit unchanged from that in memory so it responds on the bus with a 'Hit with no Castout' and updates the directory status to 'read-only' to L2 and to all processors in this remote cluster. With no data being castout from a remote L2, the requested storage unit is placed on the bus from memory. As data is being received off the bus and forwarded to processor 0, the L2 updates its directory with a new status of RRU.

The seventh operation sequence is the Fetch Read Only Operation Sequence 7 (FRO-7). An instruction fetch by processor 0 finds the state of the storage unit to be 'invalid' in the L1 cache. This results in a 'Fetch Read Only' request issued to the local L2. The L2 does a directory search for the processor's request and determines the storage unit exists in an 'invalid' state. This results in a 'Fetch Read Only' request issued on the shared bus to the memory and to all other clusters. Each remote L2 then does a directory search with the bus command request. A remote L2 finds the storage unit exists in a state which is 'exclusive' to the L2 and to one of its processors. The other remote L2s finds the storage unit in an 'invalid' state in each of their caches. The remote L2 sends the 'exclusive' processor a cross invalidation command of 'Demote to RO' and then waits for the XI response. Processor sends response to L2 with the understanding that no new Store commands to the storage unit will be sent, and that it no longer has the data in an 'exclusive' state. Upon the XI response, the remote L2 sees its copy of the storage unit changed from that in memory so it responds on the bus with a 'Castout with Storage Update' and updates the directory status to 'read-only' to L2 and to all processors in this remote cluster. With data being castout from a remote L2, the requested storage unit is placed on the bus to memory for update and to the local L2. As data is being received off the bus and forwarded to processor 0, the L2 updates its directory with a new status of RRU.

The eighth operation sequence is the Fetch Read Only Operation Sequence 8 (FRO-8). An instruction fetch by processor 0 finds the state of the storage unit to be 'invalid' in the L1 cache. This results in a 'Fetch Read Only' request issued to the local L2. The L2 does a directory search for the processor'request and determines the storage unit also exists in an 'invalid' state. This results in a 'Fetch Read Only' request issued on the shared bus to the memory and to all other clusters. Each remote L2 then does a directory search with the bus command request. A remote L2 finds the storage unit exists in a state which is 'exclusive' to the L2 and 'read-only' to one or more of its processors. The other remote L2s finds the storage unit in an 'invalid' state in each of their caches. Since there is no processor ownership conflict with the requested storage unit, the remote L2 sees its copy of the storage unit unchanged from that in memory so it responds on the bus with a 'Hit with no Castout' and updates the directory status to 'read-only' to L2 and to all processors in this remote cluster. With no data being castout from a remote L2, the requested storage unit is placed on the bus from memory. As data is being received off the bus and forwarded to processor 0, the L2 updates its directory with a new status of RRU.

The ninth operation sequence is the Fetch Read Only Operation Sequence 9 (FRO9). An instruction fetch by processor 0 finds the state of the storage unit to be 'invalid' in the LI cache. This results in a 'Fetch Read Only' request issued to the local L2. The L2 does a directory search for the processor'request and determines the storage unit also exists in an 'invalid' state. This results in a 'Fetch Read Only' request issued on the shared bus to the memory and to all other clusters. Each remote L2 then does a directory search with the bus command request. A remote L2 finds the storage unit exists in a state which is 'exclusive' to the L2 and 'read-only' to one or more of its processors. The other remote L2s finds the storage unit in an 'invalid' state in each of their caches. Since there is no processor ownership conflict with the requested storage unit, the remote L2 sees its copy of the storage unit changed from that in memory so it responds on the bus with a 'Castout with Storage Update' and updates the directory status to 'read-only' to L2 and to all processors in this remote cluster. With data being castout from a remote L2, the requested storage unit is placed on the bus to memory for update and to the local L2. As data is being received off the bus and forwarded to processor 0, the L2 updates its directory with a new status of RRU.

The tenth operation sequence is the Fetch Read Only Operation Sequence 10 (FRO-10). An instruction fetch by processor 0 finds the state of the storage unit to be 'invalid' in the L1 cache. This results in a 'Fetch Read Only' request issued to the local L2. The L2 does a directory search for the processor'request and determines the storage unit also exists in an 'invalid' state. This results in a 'Fetch Read Only' memory and to al the shared bus to the memory and to all other clusters. Each remote L2 then does a directory search with the bus command request. One or more of the remote L2 finds the storage unit exists in a state which is 'read-only' to the L2 and 'read-only' to one or more of its processors. Since there is no processor ownership conflict with the requested storage unit, the remote L2 sees its copy of the storage unit unchanged from that in memory so it responds on the bus with a 'Hit with no Castout' and keeps the directory status the same. With no data being castout from a remote L2, the requested storage unit is placed on the bus from memory. As data is being received off the bus and forwarded to processor 0, the L2 updates its directory with a new status of RRU.

The eleventh operation sequence is also the first of the "Fetch Exclusive" sequences. It is the Fetch Exclusive Operation Sequence 1 (FEX-1). A store instruction by processor 0 finds the state of the storage unit to be 'invalid' in the LI cache. This results in a 'Fetch Exclusive' request issued to the local L2. The L2 does a directory search for the processor'request and determines the storage unit also exists in an 'invalid' state. This results in a 'Fetch Exclusive' request issued on the shared bus to the memory and to all other clusters. Each remote L2 then does a directory search with the bus command request. A status of 'invalid' state is found on all the remote L2'. With no data being castout from a remote L2, the requested storage unit is placed on the bus from memory. As data is being received off the bus and forwarded to processor 0, the L2 updates its directory with a new status of EEUO.

The twelfth operation sequence is the Fetch Exclusive Operation Sequence 2 (FEX-2). A store instruction by processor 0 finds the state of the storage unit to be 'invalid' in the L1 cache. This results in a 'Fetch Exclusive' request issued to the local L2. The L2 does a directory search for the processor'request and determines the storage unit also exists in a state which is 'exclusive' to both the L2 and processor 0. The requested storage unit is accessed from the L2 cache and sent back to processor 0, and the directory state is left the same.

The thirteenth operation sequence is the Fetch Exclusive Operation Sequence 3 (FEX-3). A store instruction by processor 0 finds the state of the storage unit to be 'invalid' in the L1 cache. This results in a 'Fetch Exclusive' request issued to the local L2. The L2 does a directory search for the processor'request and determines the storage unit also exists in a state which is 'exclusive' to both the L2 and processor 1. L2 sends local processor 1 a cross invalidation command of 'Invalidate with Response' and then waits for the XI response. Processor 1 sends response to L2 with the understanding that no new Store commands to the storage unit will be sent, and that it no longer has the data in an 'exclusive' state. The requested storage unit is accessed from the L2 cache and sent back to processor 0, and the directory state is updated to show the storage unit is 'exclusive' to the local L2 and to processor 0.

The fourteenth operation sequence is the Fetch Exclusive Operation Sequence 4 (FEX-4). A store instruction by processor 0 finds the state of the storage unit to be 'invalid' in the L1 cache. This results in a 'Fetch Exclusive' request issued to the local L2. The L2 does a directory search for the processor'request and determines the storage unit also exists in a state which is 'read-only' to the local L2. This results in a 'Storage Invalidation' request issued on the shared bus to the memory and to all other clusters. Also, a 'Invalidate' command is sent to all other local processors that might have a 'read-only' copy of the storage unit in their L1 caches. Each remote L2 then does a directory search with the bus command request. A status of 'invalid' state is found on all the remote L2'. With no data being expected from the bus, the requested storage unit is accessed from the local L2 cache and sent to processor 0. The L2 updates its directory with a new status of EEUO.

The fifteenth operation sequence is the Fetch Exclusive Operation Sequence 5 (FEX-5). A store instruction by processor 0 finds the state of the storage unit to be 'invalid' in the LI cache. This results in a 'Fetch Exclusive' request issued to the local L2. The L2 does a directory search for the processor'request and determines the storage unit exists in a state which is 'read-only' to the local L2. This results in a 'Storage Invalidation' request issued on the shared bus to the memory and to all other clusters. Also, a 'Invalidate' command is sent to all other local processors that might have a 'read-only' copy of the storage unit in their LI cache. Each remote L2 then does a directory search with the bus command request. One or more of the remote L2s find the storage unit exists in a state which is 'read-only' to the L2 and 'read-only' to one or more of their processors. On the remote L2s with the XI hit, an 'Invalidate' command is sent to all the attached processors, and then update the L2 directory status of the storage unit to an 'invalid' state. With no data being expected from the bus, the requested storage unit is accessed from the local L2 cache and sent to processor 0. The L2 updates its directory with a new status of EEUO.

The sixteenth operation sequence is the Fetch Exclusive Operation Sequence 6 (FEX-6). A store instruction by processor 0 finds the state of the storage unit to be 'invalid' in the LI cache. This results in a 'Fetch Exclusive' request issued to the local L2. The L2 does a directory search for the processor'request and determines the storage unit also exists in an 'invalid' state. This results in a 'Fetch Exclusive' request issued on the shared bus to the memory and to all other clusters. Each remote L2 then does a directory search with the bus command request. A remote L2 finds the storage unit exists in a state which is 'exclusive' to the L2 and to one of its processors. The other remote L2s find the storage unit in an 'invalid' state in each of their caches. The remote L2 sends the 'exclusive' processor a cross invalidation command of 'Invalidate with Response' and then waits for the XI response before proceeding. The processor sends a response to the L2 with the understanding that no new Store commands to the storage unit will be sent, and that it no longer has the data in an 'exclusive' state. Upon I the XI response, the remote L2 sees its copy of the storage unit unchanged from that in memory so it responds on the bus with a 'Hit with no Castout' and updates the directory status to an 'invalid' state. With no data being castout from a remote L2, the requested storage unit is placed on the bus from memory. As data is being received off the bus and forwarded to processor 0, the L2 updates its directory with a new status of EEUO.

The seventeenth operation sequence is the Fetch Exclusive Operation Sequence 7 (FEX-7). A store instruction by processor 0 finds the state of the storage unit to be 'invalid' in the L1 cache. This results in a 'Fetch Exclusive' request issued to the local L2. The L2 does a directory search for the processor'request and determines the storage unit also exists in an 'invalid' state. This results in a 'Fetch Exclusive' request issued on the shared bus to the memory and to all other clusters. Each remote L2 then does a directory search with the bus command request. A remote L2 finds the storage unit exists in a state which is 'exclusive' to the L2 and to one of its processors. The other remote L2s find the storage unit in an 'invalid' state in each of their caches. The remote L2 sends the 'exclusive' processor a cross invalid comma command of 'Invalidate with Response' and then waits for the XI response before proceeding. The processor sends a response to the L2 with the understanding that no new Store commands to the storage unit will be sent, and that it no longer has the data in an 'exclusive' state. Upon the XI response, the remote L2 sees its copy of the storage unit changed from that in memory so it responds on the bus with a 'Castout with no Storage Update' and updates the directory status to an 'invalid' state. With data being castout from a remote L2, the requested storage unit is placed on the bus to memory for update and to the local L2. As data is being received off the bus and forwarded to processor 0, the L2 updates its directory with a new status of EECO.

The eighteenth operation sequence is the Fetch Exclusive Operation Sequence 8 (FEX-8). A store instruction by processor 0 finds the state of the storage unit to be 'invalid' in the LI cache. This results in a 'Fetch Exclusive' request issued to the local L2. The L2 does a directory search for the processor's request and determines the storage unit exists in an invalid state. This results in a 'Fetch Exclusive' request issued on the shared bus to the memory and to all other clusters. Each remote L2 then does a directory search with the bus command request. A remote L2 finds the storage unit exists in a state which is 'exclusive' to the L2 and 'read-only' to one or more of its processors. The other remote L2s find the storage unit in an 'invalid' state in each of their caches. The remote L2 sends the 'Invalidate' command to all of the attached processors, and then update the L2 directory status of the storage unit to an 'invalid' state. With no data being castout from a remote L2, the requested storage unit is placed on the bus from memory. As data is being received off the bus and forwarded to processor 0, the L2 updates its directory with a new status of EEUO.

The nineteenth operation sequence is the Fetch Exclusive Operation Sequence 9 (FEX-9). A store instruction by processor 0 finds the state of the storage unit to be 'invalid' in the L1 cache. This results in a 'Fetch Exclusive' request issued to the local L2. The L2 does a directory search for the processor's request and determines the storage unit exists in an invalid state. This results in a 'Fetch Exclusive' request issued on the shared bus to the memory and to all other clusters. Each remote L2 then does a directory search with the bus command request. A remote L2 finds the storage unit exists in a state which is 'exclusive' to the L2 and 'read-only' to one or more of its processors. The other remote L2s find the storage unit in an 'invalid' state in each of their caches. The remote L2 sends the 'Invalidate' command to all of the attached processors, and sees its copy of the storage unit changed from that in memory so it responds on the bus with a 'Castout with no Storage Update' and updates the directory status to an 'invalid' state. With data being castout from a remote L2, the requested storage unit is placed on the bus to memory for update and to the local L2. As data is being received off the bus and forwarded to processor 0, the L2 updates its directory with a new status of EECO.

The twentieth operation sequence is the Fetch Exclusive Operation Sequence 10 (FEX-10). A store instruction by processor 0 finds the state of the storage unit to be 'invalid' in the LI cache. This results in a 'Fetch Exclusive' request issued to the local L2. The L2 does a directory search for the processor's request and determines the storage unit exists in an 'invalid' state. This results in a 'Fetch Exclusive' request issued on the shared bus to the memory and to all other clusters. Each remote L2 then does a directory search with the bus command request. One or more of the remote L2s find the storage unit exists in a state which is 'read-only' to the L2 and 'read-only' to one or more of its processors. On the remote L2s with the XI hit, an 'Invalidate' command is sent to all the attached processors, and then update the L2 directory status of the storage unit to an 'invalid' state. With no data being castout from a remote L2, the requested storage unit is placed on the bus from memory. As data is being received off the bus and forwarded to processor 0, the L2 updates its directory with a new status of EEUO.

The twenty first operation sequence is also the first of the "Fetch Conditional Exclusive" operation sequences. It is the Fetch Conditional Exclusive Operation Sequence 1 the L1 cache. This results in a 'Fetch Conditional Exclusive' request issued to the local L2. The L2 does a directory search for the processor'request and determines the storage unit also exists in an 'invalid' state. This results in a 'Fetch Conditional Exclusive' request issued on the shared bus to the memory and to all other clusters. Each remote L2 then does a directory search with the bus command request. A status of 'invalid' state is found on all the remote L2'. With no data being castout from a remote L2, the requested storage unit is placed on the bus from memory. As data is being received off the bus and forwarded to processor 0, the L2 updates its directory with a new status of EEUO.

The twenty second operation sequence is the Fetch Conditional Exclusive Operation Sequence 2 (FCE-2). An operand fetch by processor 0 finds the state of the storage unit to be 'invalid' in the L1 cache. This results in a 'Fetch Conditional Exclusive' request issued to the local L2. The L2 does a directory search for the processor'request and determines the storage unit also exists in a state which is 'exclusive' to both the L2 and processor 0. The requested storage unit is accessed from the L2 cache and sent back to processor 0, and the directory state is left the same.

The twenty third operation sequence is the Fetch Conditional Exclusive Operation Sequence 3 (FCE-3). An operand fetch by processor 0 finds the state of the storage unit to be 'invalid' in the LI cache. This results in a 'Fetch Conditional Exclusive' request issued to the local L2. The L2 does a directory search for the processor'request and determines the storage unit exists in a state which is 'exclusive' to both the L2 and processor 1. L2 sends local processor 1 a cross invalidation command of 'Demote to RO' and then waits for the XI response back before proceeding. Processor 1 sends response to L2 with the understanding that no new Store commands to the storage unit will be sent, and that it no longer has the data in an 'exclusive' state. The requested storage unit is accessed from the L2 cache and sent back to processor 0, and the directory state is updated to show the storage unit is 'exclusive' to the local L2 and 'read-only' to all local processors.

The twenty fourth operation sequence is the Fetch Conditional Exclusive Operation Sequence 4 (FCE-4). An operand fetch by processor 0 finds the state of the storage unit to be 'invalid' in the LI cache. This results in a 'Fetch Conditional Exclusive' request issued to the local L2. The L2 does a directory search for the processor's request and determines the storage unit also exists in a state which is 'read-only' to the local L2 and 'invalid' on the remote L2s. The requested storage unit is accessed from the L2 cache and sent back to processor 0, and the directory state is left the same.

The twenty fifth operation sequence is the Fetch Conditional Exclusive Operation Sequence 5 (FCE-5). An operand fetch by processor 0 finds the state of the storage unit to be 'invalid' in the LI cache. This results in a 'Fetch Conditional Exclusive' request issued to the local L2. The L2 does a directory search for the processor'request and determines the storage unit also exists in a state which is 'read-only' to the local L2 and the remote L2s. The requested storage unit is accessed from the L2 cache and sent back to processor 0, and the directory state is left the same.

The twenty sixth operation sequence is the Fetch Conditional Exclusive Operation Sequence 6 (FCE-6). An operand fetch by processor 0 finds the state of the storage unit to be 'invalid' in the LI cache. This results in a 'Fetch Conditional Exclusive' request issued to the local L2. The L2 does a directory search for the processor's request and determines the storage unit also exists in an 'invalid' state. This results in a 'Fetch Conditional Exclusive' request issued on the shared bus to the memory and to all other clusters. Each remote L2 then does a directory search with the bus command request. A remote L2 finds the storage unit exists in a state which is 'exclusive' to the L2 and the one of its processors. The other remote L2s find the storage unit in an 'invalid' state in each of their caches. The remote L2 sends the 'exclusive' processor a cross invalidation command of 'Demote to RO' and then waits for the XI response before proceeding. Processor sends response to L2 with the understanding that no new Store commands to the storage unit will be sent, and that it no longer has the data in an 'exclusive' state. Upon the XI response, the remote L2 sees its copy of the storage unit unchanged from that in memory so it responds on the bus with a 'Hit with no Castout' and updates the directory status to 'read-only' to L2 and to all processors in this remote cluster. With no data being castout from a remote L2, the requested storage unit is placed on the bus from memory. As data is being received off the bus and forwarded to processor 0, the L2 updates its directory with a new status of RRU.

The twenty seventh operation sequence is the Fetch Conditional Exclusive Operation Sequence 7 (FCE-7). An operand fetch by processor 0 finds the state of the storage unit to be 'invalid' in the LI cache. This results in a 'Fetch Conditional Exclusive' request issued to the local L2. The L2 does a directory search for the processor's request and determines the storage unit also exists in an 'invalid' state. This results in a 'Fetch Conditional Exclusive' request issued on the shared bus to the memory and to all other clusters. Each remote L2 then does a directory search with the bus command request. A remote L2 finds the storage unit exists in a state which is 'exclusive' to the L2 and the one of its processors. The other remote L2s find the storage unit in an 'invalid' state in each of their caches. The remote L2 sends the 'exclusive' processor a cross invalidation command of 'Demote to RO' and then waits for the XI response before proceeding. Processor sends response to L2 with the understanding that no new Store commands to the storage unit will be sent, and that it no longer has the data in an 'exclusive' state. Upon the XI response, the remote L2 sees its copy of the storage unit changed from that in memory so it responds on the bus with a 'Castout with Storage Update' and updates the directory status to 'read-only' to L2 and to all processors in this remote cluster. With data being castout from a remote L2, the requested storage unit is placed on the bus to memory for update and to the local L2. As data is being received off the bus and forwarded to processor 0, the L2 updates its directory with a new status of RRU.

The twenty eighth operation sequence is the Fetch Conditional Exclusive Operation Sequence 8 (FCE-8). An operand fetch by processor 0 finds the state of the storage unit to be 'invalid' in the L1 cache. This results in a 'Fetch Conditional Exclusive' request issued to the local L2. The L2 does a directory search for the processor's request and determines the storage unit also exists in an 'invalid' state. This results in a 'Fetch Conditional Exclusive' request issued on the shared bus to the memory and to all other clusters. Each remote L2 then does a directory search with the bus command request. A remote L2 finds the storage unit exists in a state which is 'exclusive' to the L2 and 'read-only' to one or more of its processors. The other remote L2s find the storage unit in an 'invalid' state in each of their caches. Since there is no processor ownership conflict with the requested storage unit, the remote L2 sees its copy of the storage unit unchanged from that in memory so it responds on the bus with a 'Hit with no Castout' and updates the directory status to 'read-only' to L2 and to all processors in this remote cluster. With no data being castout from a remote L2, the requested storage unit is placed on the bus from memory. As data is being received off the bus and forwarded to processor 0, the L2 updates its directory with a new status of RRU.

The twenty ninth operation sequence is the Fetch Conditional Exclusive, Operation Sequence 9 (FCE-9). An operand fetch by processor 0 finds the state of the storage unit to be 'invalid' in the L1 cache. This results in a 'Fetch Conditional Exclusive' request issued to the local L2. The L2 does a directory search for the processor'request and determines the storage unit also exists in an 'invalid' state. This results in a 'Fetch Conditional Exclusive' request issued on the shared bus to the memory and to all other clusters. Each remote L2 then does a directory search ' with the bus command request. A remote L2 finds the storage unit exists in a state which is 'exclusive' to the L2 and 'read-only' to one or more of its processors. The other remote L2s find the storage unit in an 'invalid' state in each of their caches. Since there is no processor ownership conflict with the requested storage unit, the remote L2 sees its copy of the storage unit changed from that in memory so it responds on the bus with a 'Castout with Storage Update' and updates the directory status to 'read-only' to L2 and to all processors in this remote cluster. With data being castout from a remote L2, the requested storage unit is placed on the bus to memory for update and to the local L2. As data is being received off the bus and forwarded to processor 0, the L2 updates its directory with a new status of RRU.

The thirtieth operation sequence is the Fetch Conditional Exclusive Operation Sequence 10 (FCE-10). An operand fetch by processor 0 finds the state of the storage unit to be 'invalid' in the LI cache. This results in a 'Fetch Conditional Exclusive' request issued to the local L2. The L2 does a directory search for the processor's request and determines the storage unit also exists in an 'invalid' state. This results in a 'Fetch Conditional Exclusive' request issued on the shared bus to the memory and to all other clusters. Each remote L2 then does a directory search with the bus command request. One or more of the remote L2 find the storage unit exists in a state which is 'read-only' to the L2 and 'read-only' to one or more of its processors. Since there is no processor ownership conflict with the requested storage unit, the remote L2 sees its copy of the storage unit unchanged from that in memory so it responds on the bus with a 'Hit with no Castout' and keeps the directory status the same. With no data being castout from a remote L2, the requested storage unit is placed on the bus from memory. As data is being received off the bus and forwarded to processor 0, the L2 updates its directory with a new status of RRU.

The thirty first operation sequence is the Store, Operation Sequence 1 (STR-1). A store operation by processor 0 finds the state of the storage unit to be 'exclusive' in the L1 cache. This results in a 'Store' request issued to the L2. The L2 does a directory search for the processor's request and determines the storage unit exists in an 'exclusive' state to processor 0 and the copy of the storage unit in the L2 cache is identical to the copy in memory. The 'Store' then gets processed into the L2 with a 'tore complete' response back to processor 0. The data is now more up-to-date than the memory copy.

The thirty second operation sequence is the Store, Operation Sequence 2 (STR-2). A store operation by processor 0 finds the state of the storage unit to be 'exclusive' in the L1 cache. This results in a 'Store' request issued to the L2. The L2 does a directory search for the processor's request and determines the storage unit exists in an 'exclusive' state to processor 0 and the copy of the storage unit in the L2 cache is more up-to-date than the copy in memory. The 'Store' then gets processed into the L2 with a 'tore complete' response back to processor 0.

DESCRIPTION OF OPERATION STEPS

All of the operation sequences listed above begin with Step 1, a processor command to the local L2. There are 4 command types that a processor can send to L2. They are:

| Step 1a | Fetch Read Only |
| Step 1b | Fetch Exclusive |
| Step 1c | Fetch Conditional Exclusive |
| Step 1d | Store |

A Fetch request (Steps 1a, 1b, 1c) is sent by the processor as a result of a L1 cache miss. The type of fetch is determined by what the processor was running on at that moment. A Fetch Read Only command is typically issued when the processor needs to make storage accesses to an instruction stream it is running on. A Fetch Exclusive command is typically issued when the processor is executing a load or store instruction into the target storage address is either not present ('invalid' state) in the L1 cache or is not in the 'exclusive' state. A Fetch Conditional Exclusive command is issued when the processor is executing a load instruction and the source storage address is not present in the L1 cache. A Store command is issued when the processor is executing a load or store instruction into the target storage address that is present in the cache and with the 'exclusive' state.

Upon receiving any one of the Step 1 commands the local L2 performs a directory search and returns a local L2 directory search status (Step 2). The L2 performs the directory search to check the status of the storage address in the L2 cache, if it exists at all in the cache. There are 3 types of status check results on a directory search. They are:

| Step 2a | Invalid State |
| Step 2b | Hit with No Conflict |
| Step 2c | Hit with Conflict |

On a directory search for a fetch command and the storage address is found to be in an 'invalid' state (2a), the L2 will perform an operation on the shared bus to fetch in the storage unit of data. If the directory search finds the status to be a 'Hit with No Conflict' (2b), the L2 does not need to send out invalidations, nor to fetch any data. But if the directory status for a fetch command is a 'Hit with Conflict' (2c), then the L2 must send out an invalidation.

If it is determined, after a directory search, that the L2 must perform a bus operation in order to complete the processing of the processor request, the L2 puts a command on the shared bus, (Step 3). There are 4 types of L2 requests on the bus that can be used at this point. They are:

| Step 3a | Fetch Read Only |
| Step 3b | Fetch Exclusive |
| Step 3c | Fetch Conditional Exclusive |
| Step 3d | Storage Invalidation |

The 3 fetch command types are determined directly from the type of fetch that was issued by the processor if the directory search finds the storage address to be an 'invalid' state. The Storage Invalidation command is sent out on the shared bus if and only if the directory status for a processor fetch exclusive request is that the storage unit exists in the L2 cache but is shared by multiple L2 clusters.

Since this invention describes a system structure that has multiple clusters of multiple processors and the clusters are all connected via a shared bus, it is necessary for the L2 in each cluster to 'snoop' the bus as part of the cache coherency protocol for maintaining storage integrity. Accordingly, Step 4 is the return of remote L2 cross interrogate directory search status. Operationally, this step is identical to step 2 except that the actions this L2 takes as a result of the search will be different. There are 3 types of XI search results. They are:

| Step 4a | Ivalid State |
| Step 4b | Hit with No Conflict |
| Step 4c | Hit with Conflict |

On a directory search for a bus fetch command and the storage address is found to be in an 'invalid' state (4a) or a 'Hit with no conflict' (4b), no further action is made by this L2 for completing the snoop operation. But on a 'Hit with conflict' (4c), this L2 must then take the appropriate actions as required by cache coherence protocol to complete the bus operation. A cross invalidation (XI) with a possible castout of the requested data are likely actions to be taken by this L2 in this case.

Step 5 denotes the remote L2 cross invalidations that are sent to remote processors. When a bus operation is referencing a unit of storage data that exists within one or more attached processors' caches in the remote L2 and a 'Hit with conflict' ensues. In response to the 'Hit with conflict' the remote L2 must issue a cross invalidation to 1 or more of the attached processors. There are 3 types of cross invalidations that the L2 can issue to the processors. They are:

| Step 5a | Invalidate |
| Step 5b | Invalidate with response |
| Step 5c | Demote to 'read-only' ownership |

An invalidate command (5a) is issued by the L2 only when the storage unit was fetched by the processor and has it in 'read-only' ownership state. Since the processor cannot be modifying the content of the data, the L2 can proceed with the snoop operation as soon as the Invalidate command is sent to the processor. Once the processor completes the cross invalidation command, the storage unit is in an invalidate state in the LI cache. The 'Invalidate with response' command (5b) is issued when the storage unit was fetched by the processor and has it in 'exclusive' state. Once the cross invalidation command has been sent, the L2 waits for a response, an acknowledgement, from the processor to indicate it has processed the invalidation and that no further stores to the requested storage unit will follow. The response will also indicate that the storage unit is in an 'invalid' state in the L1 cache. The 'Demote to read-only' command (5c) is issued by the L2 when the storage unit was fetched by the processor and has it in an 'exclusive' state. Once the cross invalidation command has been sent, the L2 waits for a response from the processor to indicate it has processed the invalidation and that no further stores to the requested storage unit will follow. The response will also indicate that the storage unit is in a 'read-only' ownership state in the L1 cache.

Step 6 denotes the remote processor responses to remote L2 cross invalidations. There is only one type of response and it is a XI completion response that gets sent only when the XI command was either a 'Invalidate with Response' or 'Demote to read-only'. All possible stores to the storage unit must have been completed by the time of the response.

Step 7 denotes remote L2 directory updates in response to snoop operations. At the conclusion of a snoop operation when the invalidation to the processor is done and all of the stores, if any, are put away into the L2 cache, the L2 directory is then updated to complete the snoop operation. There are 2 states that the directory can be updated to for a snoop operation. They are:

| Step 7a | Invalid State |
| Step 7b | RO to Cluster, RO to Processor, Data Unchanged (RRU) |

The Invalid State is the outcome of a bus operation for a 'Fetch Exclusive' or 'Storage Invalidation' command by the requesting L2. The RRU state is the outcome when the command on the bus was a 'Fetch Conditional Exclusive'.

Step 8 denotes the remote L2 responses to snoop operations. On a bus operation, all of the remote L2s must be snooping on the bus. A response on the bus by each remote L2 is required if the requested storage unit exists in their caches. There are 3 types of responses that a remote L2 can put on the bus. they are:

| Step 8a | Hit with no Castout |
| Step 8b | Castout with no Storage Update |
| Step 8c | Castout with Storage Update |

The response of 'Hit with no Castout' (8a) indicates that this remote L2 had a XI hit and that its copy of the storage unit is unchanged from the copy in storage. The response of 'Castout with no Storage Update' (8b) indicates that remote L2 is sending out the latest copy of the requested storage unit only for the local L2. The response of 'Castout with Storage Update' (8c) indicates that this remote L2 is sending out the latest copy of the requested storage unit for the local L2 and for the Memory Controller to update its old copy.

Step 9 refers to L2 storage updates in response to castouts. As a response for a bus command, the remote L2 may be casting out the latest copy of the requested storage unit. Before the castout takes place, the remote L2 determines from the bus command type and from its XI directory search status whether to update storage with the castout data. Only if the bus command was a 'Fetch Conditional Exclusive' will there be a 'Castout with Storage Update' response.

Step 10 denotes local L2 directory updates. The directory update in the local L2 is made as the local processor's request completes and that the initial directory status is different from what the final status is. If the requested storage unit was initially an 'invalid' state in the cache, or has an ownership conflict with other processors then a directory update is made to reflect the new ownership state of the storage unit in the cache. There are 5 possible states for the directory update. They are:

| Step 10a | RO to Cluster, RO to Local Processors, Data Unchanged (RRU) |
| Step 10b | Exclusive to Cluster and Processor 0, Data Unchanged (EEU0) |
| Step 10c | Exclusive to Cluster and Processor 0, Data Changed (EEC0) |
| Step 10d | Exclusive to Cluster, RO to Processor (ERx) |
| Step 10e | Exclusive to Cluster and Processor 0 (EEx0). |

See definitions for Directory States for description of the above states.

Step 11 refers to local L2 final responses to local processor requests. When the local L2 has taken whatever necessary actions to process the processor's request, L2 must provide a completion indication back to the processor. For a fetch type request, the L2 will send back the storage data and a response that lets the processor know what ownership state to update its LI directory to. For a store request, the L2 will send back a store complete indication.

| Step 11a | Read Only and Data |
| Step 11b | Exclusive and Data |
| Step 11c | Store Complete |

The 'Read Only and Data' response means the processor can only reference the returning data since other processors may also be referencing their copies of the same storage unit from their L1 caches. The 'Exclusive and Data' response means the processor has the only copy of the returning data, so it can modify the data. The 'Store Complete' response means the storage address in L2 has been updated and is now identical to what is in the L1 cache.

Step 12 refers to the passing of data from system memory in response to a fetch command when there is no castout response from any of the remote L2s.

Step 13 refers to local L2 cross invalidations to local processors. After an initial L2 directory search is made (step 2) and a 'Hit and conflict' is found with 1 or more of the attached local processors, the local L2 will issue a XI command to those local processors. There are 3 types of cross invalidations that the L2 can issue to the processors. They are:

| Step 13a | Invalidate |
| Step 13b | Invalidate with response |
| Step 13c | Demote to 'read-only' ownership |

An Invalidate command (13a) is issued by the L2 only when the storage unit was fetched by the processor and has it in 'read-only' ownership state. Since the processor cannot be modifying the content of the data, the L2 can proceed with the snoop operations as soon as the Invalidate command is sent to the processor. Once the processor completes the cross invalidation command, the storage unit is in an invalid state in the L1 cache. The 'Invalidate with response' command (13b) is issued when the storage unit was fetched by the processor and has it in 'exclusive' state. Once the cross invalidation command has been sent, the L2 waits for a response, an acknowledgement from the processor to indicate that the processor has processed the invalidation and that no further stores to the requested storage unit will follow. The response will also indicate that the storage unit is an 'invalid' state in the L1 cache. The 'Demote to read-only' command (13c) is issued by the L2 when the storage unit was fetched by the processor and has it in an 'exclusive' state. Once the cross invalidation command has been sent, the L2 waits for a response from the processor to indicate that the processor has processed the invalidation and that no further stores to the requested storage unit will follow. The response will also indicate that the storage unit is in a 'read-only' ownership state in the LI cache.

The final step, Step 14 refers to local processor responses to local L2 cross invalidates. There is only one type of response and it is a XI completion response that gets sent only when the XI command was either a 'Invalidate with Response' or 'Demote to read-only'. All possible stores to the storage unit must have been completed by the time of the response.

TABLE 1

Fetch Read Only Operations

| CPO | Initial State | | | Final State | | | |
|---|---|---|---|---|---|---|---|
| OP-SEQ | LP0 | LL2 | RL2 | LP0 | LL2 | RL2 | Operation steps |
| FRO-1 | I | I | I | R | RRU | I | 1a, 2a, 3a, 4a, 12a, 10a, 11a |
| FRO-2 | I | EEx0 | I | R | EEx0 | I | 1a, 2b, 11a |
| FRO-3 | I | EEx1 | I | R | ERx | I | 1a, 2c, 13c, 14, 10d, 11a |
| FRO-4 | I | RRU | I | R | RRU | I | 1a, 2b, 11a |
| FRO-5 | I | RRU | RRU | R | RRU | RRU | 1a, 2b, 11a |
| FRO-6 | I | I | EEU0 | R | RRU | RRU | 1a, 2a, 3a, 4c, 5c, 6, 7b, 8a, 12, 10a, 11a |
| FRO-7 | I | I | EEC0 | R | RRU | RRU | 1a, 2a, 3a, 4c, 5c, 6, 7b, 8b, 9, 10a, 11a |
| FRO-8 | I | I | ERU | R | RRU | RRU | 1a, 2a, 3a, 4c, 7b, 8a, 12, 10a, 11a |
| FRO-9 | I | I | ERC | R | RRU | RRU | 1a, 2a, 3a, 4c, 7b, 8b, 9, 10a, 11a |
| FRO-10 | I | I | RRU | R | RRU | RRU | 1a, 2a, 3a, 4b, 8b, 12, 10a, 11a |

TABLE 2

Fetch Exclusive Operations

| CPO | Initial State | | | Final state | | | |
|---|---|---|---|---|---|---|---|
| OP-SEQ | LP0 | LL2 | RL2 | LP0 | LL2 | RL2 | Operation steps |
| FEX-1 | I | I | I | E | EEU0 | I | 1b, 2a, 3b, 4a, 12, 10a, 11a |
| FEX-2 | I | EEx0 | I | E | EEx0 | I | 1b, 2b, 11b |
| FEX-3 | I | EEx1 | I | E | EEx0 | I | 1b, 2c, 3b, 14, 10e, 11b |
| FEX-4 | I | RRU | I | E | EEU0 | I | 1b, 2c, 3d, 4a, 13a, 14, 10b, 11b |
| FEX-5 | I | RRU | RRU | E | EEU0 | I | 1b, 2c, 3d, 4c, 5a, 7a, 8a, 13a, 14, 10b, 11b |
| FEX-6 | I | I | EEU0 | E | EEU0 | I | 1b, 2a, 3b, 4c, 5b, 6, 7a, 8a, 12, 10b, 11b |
| FEX-7 | I | I | EEC0 | E | EEC0 | I | 1b, 2a, 3b, 4c, 5b, 6, 7a, 8b, 10c, 11b |
| FEX-8 | I | I | ERU | E | EEU0 | I | 1b, 2a, 3b, 4c, 5a, 7a, 8a, 12, 10b, 11b |
| FEX-9 | I | I | ERC | E | EEC0 | I | 1b, 2a, 3b, 4c, 5a, 7a, 8b, 10c, 11b |
| FEX-10 | I | I | RRU | E | EEU0 | I | 1b, 2a, 3b, 4c, 5a, 7a, 8a, 12, 10b, 11b |

TABLE 3

Fetch Conditional Exclusive Operations

| CPO | Initial State | | | Final State | | | |
|---|---|---|---|---|---|---|---|
| OP-SEQ | LPO | LL2 | RL2 | LPO | LL2 | RL2 | Operation steps |
| FCE-1 | I | I | I | E | EEU0 | I | 1c, 2a, 3c, 4a, 12, 10b, 11b |
| FCE-2 | I | EEx0 | I | E | EEx0 | I | 1c, 2b, 11b |
| FCE-3 | I | EEx1 | I | R | ERx | I | 1c, 2c, 13c, 14, 10d, 11a |
| FCE-4 | I | RRU | I | R | RRU | I | 1c, 2b, 11a |
| FCE-5 | I | RRU | RRU | R | RRU | RRU | 1c, 2b, 11a |
| FCE-6 | I | I | EEU0 | R | RRU | RRU | 1c, 2a, 3c, 4c, 5c, 6, 7b, 8a, 12, 10a, 11a |
| FCE-7 | I | I | EEC0 | R | RRU | RRU | 1c, 2a, 3c, 4c, 5c, 6, 7b, 8c, 9, 10a, 11a |
| FCE-8 | I | I | ERU | R | RRU | RRU | 1c, 2a, 3c, 4c, 7b, 8a, 12, 10a, 11a |
| FCE-9 | I | I | ERC | R | RRU | RRU | 1c, 2a, 3c, 4c, 7b, 8c, 9, 10a, 11a |
| FCE-10 | I | I | RRU | R | RRU | RRU | 1c, 2a, 3c, 4b, 8a, 12, 10a, 11a |

TABLE 4

Store Operations

| CPO | Initial State | | | Final state | | | Operation |
|---|---|---|---|---|---|---|---|
| OP-SEQ | LPO | LL2 | RL2 | LPO | LL2 | RL2 | steps |
| STR-1 | E | EEU0 | I | E | EEC0 | I | 1d, 2b, 11c |
| STR-2 | E | EEC0 | I | E | EEC0 | I | 1d, 2b, 11c |

A block diagram of a level two cache capable of implementing the directory states, operations, and operation steps described above is shown in FIG. 4. For purposes of illustration, the level two cache of FIG. 4 will be described as though it were being used as level two cache 334a of FIG. 3. Signals 402–408 are passed between the level two cache and the local processors, while signals 410, 412 and 414 are passed between the level two cache and the shared bus. The level two cache elements will be described individually with the interactions between elements being described as appropriate.

DESCRIPTION OF LEVEL TWO CACHE ELEMENTS

Figure 4:
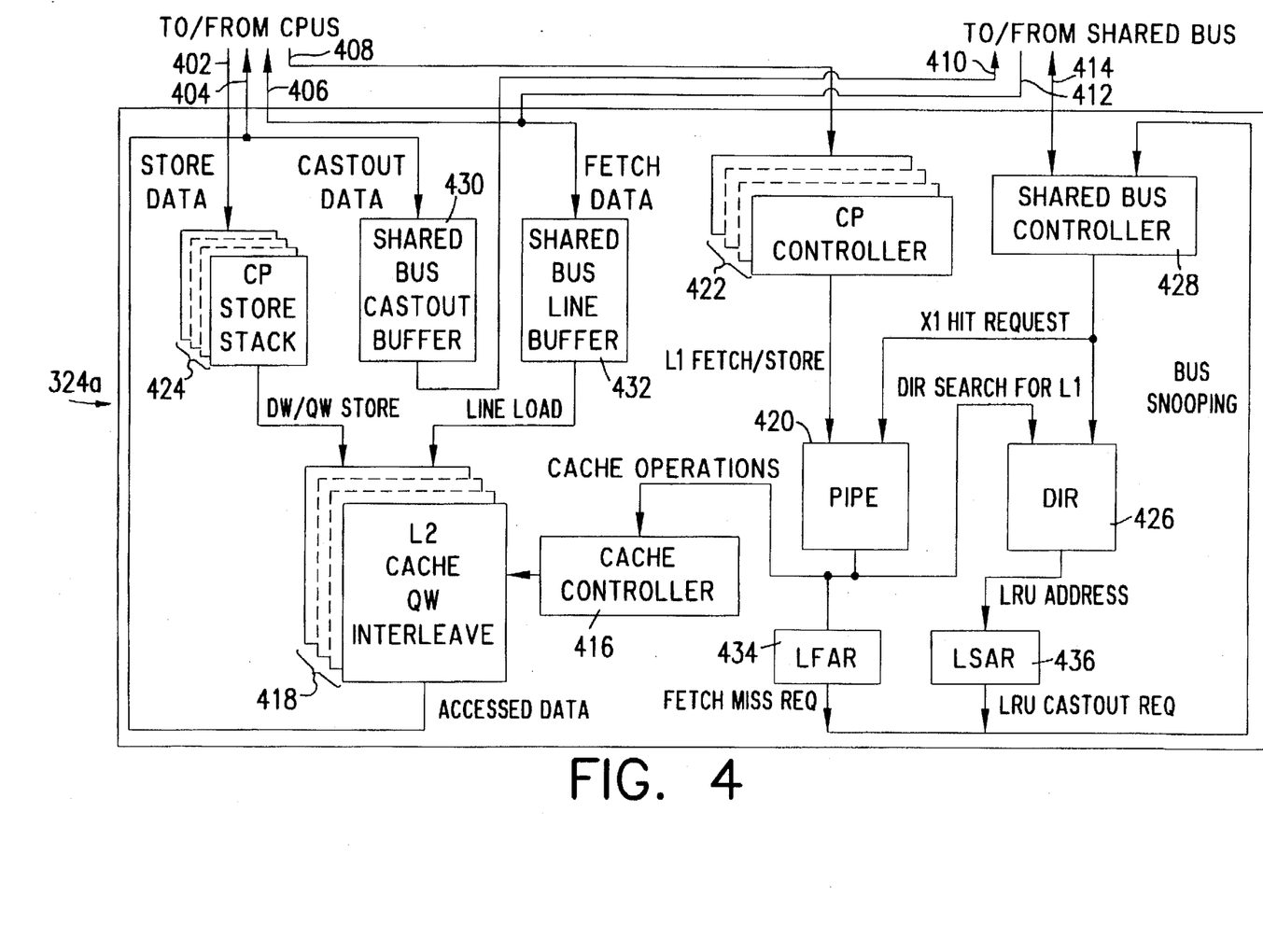
FIG. 4 is a block diagram of a level two cache suitable for use with the present invention.

A cache controller 416 co-ordinates all data reads and writes of the cache memory. The cache memory, where any data units stored in the cache are held, is made up of a plurality of cache interleaves 418.

Dividing the cache memory up into interleaves increases the caches efficiency by allowing multiple simultaneous reads and/or writes to the cache memory subject to the condition that the simultaneous reads and/or writes do not require access to the same interleave. Typically the amount of data that can be read from or written to a cache memory in a single machine cycle is less than a full data unit. Therefore, to complete a read or write multiple machine cycles are required. System performance is limited by giving a read or write operation exclusive access to the entire cache memory for the duration of the operation. By contrast, the interleave configuration allows multiple read and/or write operations to access the cache at the same time, and therefore increases system performance.

All operations performed by the level two cache are carried out by a pipeline processor 420. The pipeline initiates such operations at the request of other cache elements. The pipeline consists of a plurality of processing circuits connected in series, through which the various requests travel. Each request is present in a processing circuit for one machine cycle, and each processing circuit performs a portion of the processing (initiates an action) necessary to complete the requested operation. Occasionally, completion of a requested operation requires multiple passes through the pipeline.

In a preferred embodiment, the pipeline consists of four processing circuits and includes priority, which is used to determine the order in which operation requests are honored when there are multiple outstanding requests. The actions initiated by each of the four processing circuits are listed below.

First processing circuit (first machine cycle):
Directory Reads
Directory Writes
Second processing circuit (second machine cycle):
Cache Interleave Reads
Third processing circuit (third machine cycle):
Cache Interleave Writes
LFAR loads
Shared Bus Castout Buffer Loads
Directory Changed Line Status Reads
Directory Changed Line Status Writes
Fourth processing circuit (fourth machine cycle):
LSAR loads
Cross-Invalidate Requests sent to local processors The level two cache includes a plurality of Central Processor (CP) controllers 422, one for each processor within the level two cache's cluster. Each CP controller manages the requests sent by its associated processor.

A plurality of store stacks 424 is also provided. Each stack is associated with a processor, and is used to hold the data that accompanies a store request. In a preferred embodiment, there may be multiple outstanding requests, and, in particular, multiple outstanding store requests. In such a system the store stack may be a first in, first out buffer (FIFO buffer).

The CP controller sends requests to the pipe and tracks each request as it progresses through the pipe's processing circuits. It is also responsible for controlling the transfer of store data from its associated store stack to the level two cache and for transferring fetch data back to its associated processor. In addition, the controller transmits appropriate responses to its associated processor at the completion of fetch or store requests.

Moreover, the CP controller assists in forwarding cross invalidate commands to processors. Its role is to generate the appropriate Cross-Invalidate signals to its associated processor in response to fetch requests from other processors. Since multiple XI requests may be outstanding at a given time, the controller needs to manage these requests and XI responses accordingly.

A directory 426 is provided for storing a record of which data units reside within the level two cache and the state for each stored data unit.

A shared bus controller 428 manages all of the level two caches communications with the shared bus. This includes both outgoing (level two cache initiated commands) and incoming (shared bus snoop) commands.

For in-coming commands, the controller monitors the shared bus to determine when the directory needs to be searched. If the command and directory state dictate, the controller sends a request to the pipe to perform necessary directory state updates, processor cross-invalidates, and cache interleave accesses. It is also responsible for placing the results of directory searches, possibly including changed data, onto the shared bus.

With respect to out-going commands, the bus controller places all such commands onto the shared bus. It also monitors the bus for data being returned in response to a fetch command and signals the rest of the level two cache logic so that the returning data can be routed to the cache interleaves and the requesting processor.

A shared bus castout buffer 430 is provided as a temporary storage area for data units in the cache interleaves that need to be put on the shared bus. Such data units are identified in response to a snoop command or a store command. A store command requires data to be put on the shared bus when data being removed from the cache interleaves to make room for the data being stored is more up to date than the corresponding copy of that data stored in the system memory, thus necessitating that the more up to date copy be written to the system memory.

A shared bus line buffer 432 is used to store data units returned over the shared bus in response to fetch commands.

An Line Fetch Address Register (LFAR) 434 is used to hold processor fetch requests for data units that are not stored in the cache interleaves. When the interleaves do not contain the requested data units, the LFAR signals the shared bus controller to issue a fetch command on the shared bus. After the fetch data is received and loaded into the shared bus line buffer, LFAR signals the pipe, requesting that the data be written into the cache interleaves and that the directory be updated.

When a processor attempts to fetch a data unit that does not exist in the cache interleaves, that processor's associated level two cache retrieves the data unit, places it in its cache interleaves, and passes it to the requesting processor. In order to make room for the data unit in the cache interleaves, an existing interleave entry must be deleted. A Line Store Address Register (LSAR) 436 is provided for determining which existing interleave entry to delete. If necessary, the LSAR signals the pipe, requesting that cross-invalidate requests be sent to the local processors. In addition, the LSAR updates the directory to mark the replaced line as being 'invalid' in the cache.

If the LSAR determines that the cache interleave entry being replaced is in a changed state the LSAR signals the pipe and the shared bus controller. It signals the pipe first, requesting that the shared bus castout buffer be loaded. Following the loading of the castout buffer, it signals the shared bus controller, requesting that a store command be issued on the shared bus.

We claim:

1. A cache architecture for a computer system having multiple processors comprising:

a plurality of level one caches, each said level one cache being operatively coupled to one of the multiple processors of the computer system to form a plurality of processor-level oNE cache pairs and each said level one cache being a store-through cache;

a plurality of level two caches, each of said level two caches being operatively coupled to two or more of said processor-level one cache pairs to form a cluster, and each of said level two caches having a plurality of level two directory states for the purpose of maintaining coherency among all of said caches; wherein for each said level two cache said level two directory states describe the status of the data stored in said level two cache as being invalid, exclusive to said level two cache, or read only to said level two cache; and wherein for each said level two cache said level two directory states describe the status of the data stored in said level one caches that are operatively coupled to said level two cache as being invalid, exclusive to one of said level once caches that are operatively coupled to said level two cache, or read only to one or more of said level one caches that are operatively coupled to said level two cache;

wherein when a level one cache within a cluster updates the data, the status of the level two directory states is examined and castouts sent only to the level one caches that have exclusive or read only ownership of the data;

a plurality of point to point buses, each said point to point bus coupling one of said processor-level one cache pairs to one of said level two caches;

a shared bus, said shared bus coupling together said level two caches; and wherein each of said level two caches further comprise a shared bus castout buffer for temporary storage of data in response to one of either a snoop command or a store command.

2. A cache architecture according to claim 1, wherein a parity check is performed on the level one caches.

3. A cache architecture according to claim 1, wherein each said processor-level one cache pair is housed within a single microchip.

4. A cache architecture according to claim 1, wherein each of said level two caches comprise a plurality of cache interleaves for storing data received over said point to point buses and over said shared bus, each of said interleaves being separately accessible so that any two or more interleaves can be accessed during a single machine cycle.

5. A cache architecture according to claim 4, wherein each of said level two caches further comprises a cache controller for coordinating accesses to said interleaves.

6. A cache architecture according to claim 1, wherein each of said level two caches comprise a directory for storing one or more directory states describing the state of the data residing in said level two cache.

7. A cache architecture according to claim 6, wherein each of said level two caches further comprise:

one or more central processor controllers, each said central processor controller being used to manage requests from one of said plurality of level one caches; and a shared bus controller for managing communications between said level two cache and said shared bus.

8. A cache architecture according to claim 7, wherein each of said level two caches further comprises a pipeline processor for performing operations in response to requests from said central processor controllers and said shared bus controller.

9. A cache architecture according to claim 8, wherein each of said level two caches further comprises:

a shared bus line buffer for receiving said shared bus.

10. A cache architecture according to claim 9, wherein each of said level two caches further comprises:

a line fetch address register for processing fetch requests by the processors for data that is not stored within said level two cache; and a line store address register for determining which data to remove from said level two cache when it is necessary to make room for new data.

11. A cache architecture according to claim 9, wherein each of said level two caches further comprises one or more store stacks, each said store stack being used to hold data accompanying store requests from one of said plurality of level one caches.

12. An architecture for a computer system having multiple processors, comprising:

a plurality of level one caches, each said level one cache being operatively coupled at one of the processors of the computer system to form a plurality of processor-level one cache pairs and each said level one cache being a store-through cache;

a plurality of level two caches, each of said level two caches being operatively coupled to two or more of said processor-level one cache pairs to form a cluster, and each of said level two caches having a plurality of level two directory states for the purpose of maintaining coherency among all of said caches; wherein for each said level two cache said level two directory states describe the status of the data stored in said level two cache as being invalid, exclusive to said level two cache, or read only to said level two cache; and wherein for each said level two cache said level two directory states describe the status of the data stored in said level one caches that are operatively coupled to said level two cache as being invalid, exclusive to one of said level one caches that are operatively coupled to said level two cache, or read only to one or more of said level one caches that are operatively coupled to said level two cache;

wherein when a level one cache within a cluster updates the data, the status of the level two directory states is examined and castouts sent only to the level one caches that have exclusive or read only ownership of the data;

a plurality of point to point buses, each said point to point bus coupling one of said processor-level one cache pairs to one of said level two caches;

a shared bus, said shared bus coupling together said level two caches, a system memory coupled to said shared bus, and wherein each of said level two caches further comprise a shared bus castout buffer for temporary storage of data in response to one of either a snoop command or a store command.

13. An architecture according to claim 12, further comprising an input/output device for communicating with said processors, and for transmitting data to and from the processors and said system memory.

14. An architecture according to claim 12, wherein a parity check is performed on the level one caches.

15. An architecture according to claim 12, wherein each said processor-level one cache pair is housed within a single microchip.

16. An architecture according to claim 12, wherein each of said level two caches comprise a plurality of cache interleaves for storing data received over said point to point buses, each of said interleaves being separately accessible so that any two or more interleaves can be accessed during a single machine cycle.

17. An architecture according to claim 16, wherein each of said level two caches further comprises a cache controller for coordinating accesses to said interleaves.

18. A architecture according to claim 12, wherein each of said level two caches comprise a directory for storing one or more directory states describing the state of the data residing in said level two cache.

19. An architecture according to claim 18, wherein each of said level two caches further comprise:

one or more central processor controllers, each said central processor controller being used to manage requests from one of said plurality of level one caches; and a shared bus controller for managing communications between said level two cache and said shared bus.

20. An architecture according to claim 19, wherein each of said level two caches further comprises a pipeline processor for performing operations in response to requests from said central processor controllers and said shared bus controller.

21. An architecture according to claim 20, wherein each of said level two caches further comprises:

a shared bus line buffer for receiving data over said shared bus.

22. An architecture according to claim 21, wherein each of said level two caches further comprises:

a line fetch address register for processing fetch requests by the processors for data that is not stored within said level two cache; and a line store address register for determining which data to remove from said level two cache when it is necessary to make room for new data.

23. An architecture according to claim 22, wherein each of said level two caches further comprises one or more store stacks, each said store stack being used to hold data accompanying store requests from one of said plurality of level one caches.

24. A hierarchical cable architecture for a computer system having multiple processors, comprising:

a shared bus;

a plurality of level two caches, each said level two cache coupled to said shared bus;

a plurality level one caches, each said level one cache being operatively coupled to one of the processors to form a plurality of processor-level one cache pairs and each said level one cache being a store-through cache;

wherein each of said level two caches have a plurality of level two directory states for the purpose of maintaining coherency among all of said caches;

wherein for each said level two cache said level two directory states describe the status of the data stored in said level two cache as being invalid, exclusive to said level two cache, or read only to said level two cache;

wherein for each said level two cache said level two directory states describe the status of the data stored in said level one caches that are operatively coupled to said level two cache as being invalid, exclusive to one of said level one caches that are operatively coupled to said level two cache, or read only to one or more of said level one caches that are operatively coupled to said level two cache;

wherein when a level one cache within a cluster updates the data, the status of the level two directory states is examined and castouts sent only to the level one caches that have exclusive or read only ownership of the data; and wherein each of said level two caches further comprise a shared bus castout buffer for temporary storage of data in response to one of either a snoop command or a store command.

25. A hierarchical cache architecture according to claim 24, wherein a parity check is performed on the level one caches.

26. A hierarchical cache architecture according to claim 24, wherein each said processor-level one cache pair is housed within a single microchip.

* * * * *